US 12,004,546 B2

(12) United States Patent
Strong et al.

(10) Patent No.: US 12,004,546 B2
(45) Date of Patent: Jun. 11, 2024

(54) METHOD OF COOKING MULTIPLE DIFFERENT FOOD ITEMS ON A GRILL DEVICE AND RELATED SYSTEMS METHODS

(71) Applicant: Traeger Pellet Grills, LLC, Salt Lake City, UT (US)

(72) Inventors: Michael B. Strong, South Jordan, UT (US); Chad Sollis, Herriman, UT (US); Ryan Tarver, South Jordan, UT (US)

(73) Assignee: Traeger Pellet Grills, LLC.

( * ) Notice: Subject to any disclaimer, the term of this patent is extended or adjusted under 35 U.S.C. 154(b) by 498 days.

(21) Appl. No.: 17/249,844

(22) Filed: Mar. 16, 2021

(65) Prior Publication Data
US 2021/0298333 A1 Sep. 30, 2021

Related U.S. Application Data

(60) Provisional application No. 63/001,080, filed on Mar. 27, 2020.

(51) Int. Cl.
| | |
|---|---|
| *A23L 5/10* | (2016.01) |
| *A47J 37/07* | (2006.01) |
| *F23N 1/00* | (2006.01) |
| *F23N 5/26* | (2006.01) |

(52) U.S. Cl.
CPC ............ *A23L 5/10* (2016.08); *A47J 37/07* (2013.01); *F23N 1/002* (2013.01); *F23N 5/265* (2013.01)

(58) Field of Classification Search
CPC .. A23L 5/10; A47J 37/07; F23N 1/002; F23N 5/265
USPC ........................................................ 126/25 R
See application file for complete search history.

(56) References Cited

U.S. PATENT DOCUMENTS

| | | | |
|---|---|---|---|
| 5,676,044 A | * | 10/1997 | Lara, Jr. ............... A21B 1/245 219/400 |
| 6,381,614 B1 | | 4/2002 | Barnett et al. |
| 6,789,067 B1 | | 9/2004 | Liebenow |
| 8,455,028 B2 | | 6/2013 | Breunig et al. |
| 9,552,461 B2 | | 1/2017 | Harrison |
| 10,034,576 B2 | | 7/2018 | Barth et al. |
| 10,158,720 B2 | | 12/2018 | Colston |

(Continued)

OTHER PUBLICATIONS

European Search Report and Written Opinion from European Application No. 21163407.6, dated Jul. 23, 2021, 6 pages.

*Primary Examiner* — Avinash A Savani
(74) *Attorney, Agent, or Firm* — TraskBritt

(57) ABSTRACT

The method may include retrieving a first cooking profile associated with the first food item, wherein the first cooking profile comprises at least one first temperature set point and at least one first time period. The method may also include controlling a temperature of the grill to the first cooking profile. The method may further include retrieving a second cooking profile associated with a second food item, wherein the second cooking profile comprises at least one second temperature set point and at least one second time period. The method may also include combining the first cooking profile and the second cooking profile to form a hybrid cooking profile comprising at least one third temperature set point and at least one third time period. The method may further include controlling the grill to the hybrid cooking profile after beginning the second cooking session.

20 Claims, 6 Drawing Sheets

(56) References Cited

U.S. PATENT DOCUMENTS

| | | |
|---|---|---|
| 10,218,833 B2 | 2/2019 | Colston |
| 10,674,866 B2 | 6/2020 | Colston |
| 2014/0044850 A1* | 2/2014 | McMahon ............ A21B 1/245 426/523 |
| 2015/0118362 A1* | 4/2015 | Raczynski ............ A47J 36/00 426/87 |
| 2016/0051078 A1 | 2/2016 | Jenkins et al. |
| 2018/0055270 A1* | 3/2018 | Heimendinger ...... A47J 36/321 |
| 2019/0125120 A1 | 5/2019 | Jenkins et al. |
| 2019/0231147 A1* | 8/2019 | Chen .................. A47J 31/4492 |
| 2019/0289119 A1 | 9/2019 | Colston |

\* cited by examiner

METHOD OF COOKING MULTIPLE DIFFERENT FOOD ITEMS ON A GRILL DEVICE AND RELATED SYSTEMS METHODS

CROSS-REFERENCE TO RELATED APPLICATION

This application claims the benefit under 35 U.S.C. § 119(e) of U.S. Provisional Patent Application Ser. No. 63/001,080, filed Mar. 27, 2020, the disclosure of which is hereby incorporated herein in its entirety by this reference.

TECHNICAL FIELD

This disclosure relates generally to grill devices and components thereof. In particular, the disclosure relates to control components of grill devices, and method of using grill devices.

BACKGROUND

Grills and smokers have long been used to prepare food and perform other tasks. For example, outdoor grills and smokers are often used to prepare meats, vegetables, fruits, and other types of food. These grills and smokers are typically operated using manual controls that are integrated into the frame of the grill or smoker. For example, many such outdoor appliances have an ignition button that, when pressed, generates a spark near a gas outlet on a burner. The spark ignites the gas and the burner begins to create heat. The amount of heat is generally controlled using a dial or nob that allows more or less gas to be introduced at the burner.

SUMMARY

Some embodiments of the present disclosure include a method of cooking a meal. The method may include beginning a first cooking session for a first food item. The method may further include receiving a first cooking profile associated with the first food item, wherein the first cooking profile comprises at least one first temperature set point and at least one first time period. The method may also include controlling a temperature of the grill to the first cooking profile. The method may further include beginning a second cooking session for a second food item before the first cooking session is completed. The method may also include receiving a second cooking profile associated with the second food item, wherein the second cooking profile comprises at least one second temperature set point and at least one second time period. The method may further include combining the first cooking profile and the second cooking profile to form a hybrid cooking profile comprising at least one third temperature set point and at least one third time period. The method may also include controlling the grill to the hybrid cooking profile after beginning the second cooking session.

Another embodiment of the present disclosure may include a non-transitory computer readable medium storing instructions thereon that, when executed by at least one processor, cause the at least one processor to begin a first cooking session for a first food item. The first cooking session may include a first cooking profile associated with the first food item, wherein the first cooking profile comprises at least one first temperature set point and at least one first time period. The instruction may further cause the processor to control the grill to the first cooking profile. The instructions may also cause the processor to begin a second cooking session for a second food item before the first cooking session is completed. The second cooking session may include a second cooking profile associated with the second food item, wherein the second cooking profile comprises at least one second temperature set point and at least one second time period. The instructions may further cause the processor to combine the first cooking profile and the second cooking profile to form a hybrid cooking profile comprising at least one third temperature set point and at least one third time period. The instructions may also cause the processor to control the grill to the hybrid cooking profile after beginning the second cooking session.

Another embodiment of the present disclosure may include a grill device. The grill device may include a cooking chamber operatively coupled to a heat source, wherein the cooking chamber is configured to receive a first food item and a second food item. The grill device may further include a controller. The controller may include at least one processor configured to control the heat source. The controller may further include a memory device configured to receive a first cooking profile for the first food item and a second cooking profile for the second food item. The controller may also include at least one non-transitory computer-readable storage medium storing instructions thereon that, when executed by the at least one processor, cause the controller to control the heat source to a first cooking chamber temperature defined by the first cooking profile when the first food item is in the cooking chamber. The instruction may further cause the controller to control the heat source to a second cooking chamber temperature defined by the second cooking profile when the second food item is in the cooking chamber. The instructions may also cause the controller to combine the first cooking profile and the second cooking profile into a hybrid cooking profile when both the first food item and the second food item are in the cooking chamber. The instructions may further cause the controller to control the heat source to a third cooking chamber temperature defined by the hybrid cooking profile.

BRIEF DESCRIPTION OF THE DRAWINGS

For a detailed understanding of the present disclosure, reference should be made to the following detailed description, taken in conjunction with the accompanying drawings, in which like elements have generally been designated with like numerals, and wherein.

DETAILED DESCRIPTION

Figure 1:
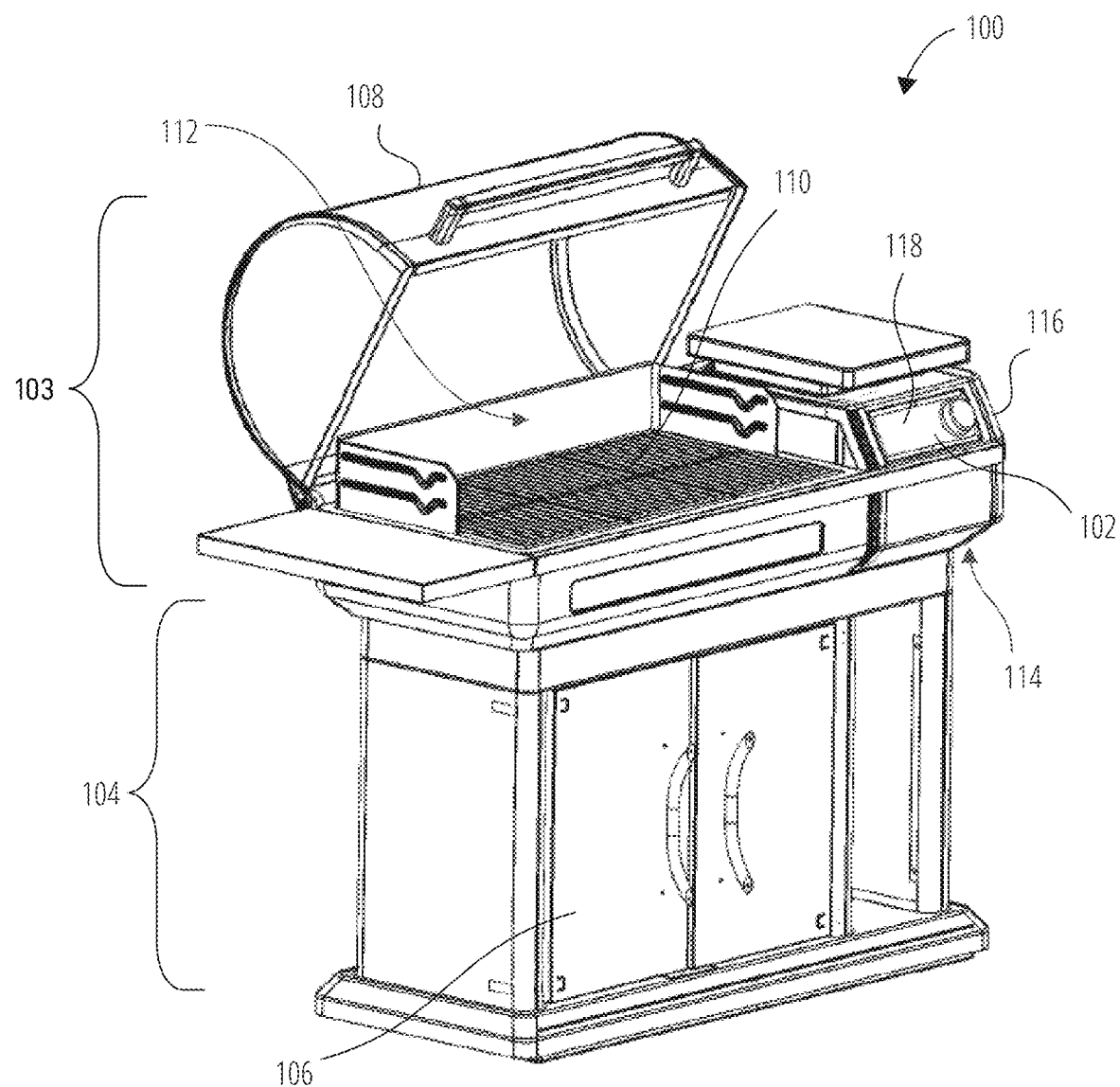
FIG. 1 illustrates a perspective view of a grill device in accordance with one or more embodiments of the present disclosure.

The illustrations presented herein are not actual views of any grill, wood-pellet grill, or any component thereof, but are merely idealized representations, which are employed to describe embodiments of the present invention.

As used herein, the singular forms following "a," "an," and "the" are intended to include the plural forms as well, unless the context clearly indicates otherwise.

As used herein, the term "may" with respect to a material, structure, feature, or method act indicates that such is contemplated for use in implementation of an embodiment of the disclosure, and such term is used in preference to the more restrictive term "is" so as to avoid any implication that other compatible materials, structures, features, and methods usable in combination therewith should or must be excluded.

As used herein, any relational term, such as "first," "second," "top," "bottom," "upper," "lower," "above," "beneath," "side," "upward," "downward," etc., is used for clarity and convenience in understanding the disclosure and accompanying drawings, and does not connote or depend on any specific preference or order, except where the context clearly indicates otherwise. For example, these terms may refer to an orientation of elements of a grill device when utilized in a conventional manner. Furthermore, these terms may refer to an orientation of elements of a grill device as illustrated in the drawings.

As used herein, the term "substantially" in reference to a given parameter, property, or condition means and includes to a degree that one skilled in the art would understand that the given parameter, property, or condition is met with a small degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, the term "about" used in reference to a given parameter is inclusive of the stated value and has the meaning dictated by the context (e.g., it includes the degree of error associated with measurement of the given parameter, as well as variations resulting from manufacturing tolerances, etc.).

As used herein, the term "grill device" means a grilling and/or smoking device used to grill and/or smoke food. Particularly, the grill devices described herein may be outdoor grill devices configured for grilling and/or smoking food in outdoor environments.

FIG. 1 shows a perspective view of a grill device 100 according to one or more embodiments of the present disclosure. As shown in FIG. 1, the grill device 100 may include a base assembly 104, a cooking portion 103, and a controller 102. The cooking portion 103 may be disposed on the base assembly 104, and the cooking portion 103 may be operably connected to the controller 102. In some embodiments, the base assembly 104 may include one or more storage areas and doors 106. For example, the base assembly 104 may include one or more cabinet assemblies. The cabinet assemblies may provide access to one or more portions of the cooking portion 103.

The cooking portion 103 may include a cover 108, one or more cooking racks 110, a cooking chamber 112, and a fuel chamber 114 (i.e., a hopper). In some embodiments, the controller 102 may be at least partially disposed in a housing 116 of the fuel chamber 114. The controller 102 may control a cooking temperature of the grill, control fuel feed rates, control cooking cycles and processes, control fuel burn rates, monitor ambient temperature, monitor internal and external temperatures, monitor fuel levels, monitor grease and ash levels, monitor cover 108 positions, monitor flame presence and levels, control ignition processes, and/or perform other functions.

In some embodiments, the controller 102 may include a display 118 for presenting information to a user. For example, the display 118 may be visible from an exterior of the grill device 100. The display 118 may show a variety of operating information and may display one or more graphical user interfaces (GUIs) that allows interaction from user. For example, a GUI may include one or more display regions and active/activatable regions. As used in this disclosure, a display region is a region of a GUI which displays information to a user. An activatable region is a region of a GUI, such as a button, slider, or a menu, which enables the user to take some action with respect to the GUI (e.g., if manipulated). Some display regions are also activatable regions in that the activatable regions display information and enable some action that may be taken by a user. In a contact-sensitive GUI, contacting a contact-sensitive area associated with an activatable region may activate that region (e.g., selecting a GUI button). Activatable regions may be displayed as GUI elements/objects, for example, buttons, sliders, selectable panes, menus, etc., all of various shapes and sizes. In particular, the components (e.g., the activatable regions of the GUI) may allow a user to interact with a collection of display elements for a variety of purposes.

In some embodiments, the grill device 100 may include a wood-pellet grill. For example, the grill device 100 may utilize wood pellets that are fed to an igniter and fire pot assembly to produce heat and smoke for cooking and preparing food products. In additional embodiments, the grill device 100 may include a charcoal smoker. In further embodiments, the grill device 100 may include a combination of a wood-pellet grill and a charcoal smoker. In yet further embodiments, the grill device 100 may include a gas grill. For instance, the grill device 100 may utilize natural gas and/or propane to produce heat for cooking and preparing food products. In some embodiments, the grill device 100 may include both a wood-pellet grill and a gas grill. For instance, the grill device 100 may utilize wood-pellets and/or gas to heat, cook, and prepare food products. As a non-limiting example, the grill device 100 may include any conventional gas system utilized on grills. For the purpose of the present application, the grill device 100 is described as a wood-pellet grill. However, the systems and components described herein are applicable to any of the grills described herein, and all of the above-described grills are within the scope of the present disclosure.

Figure 2:
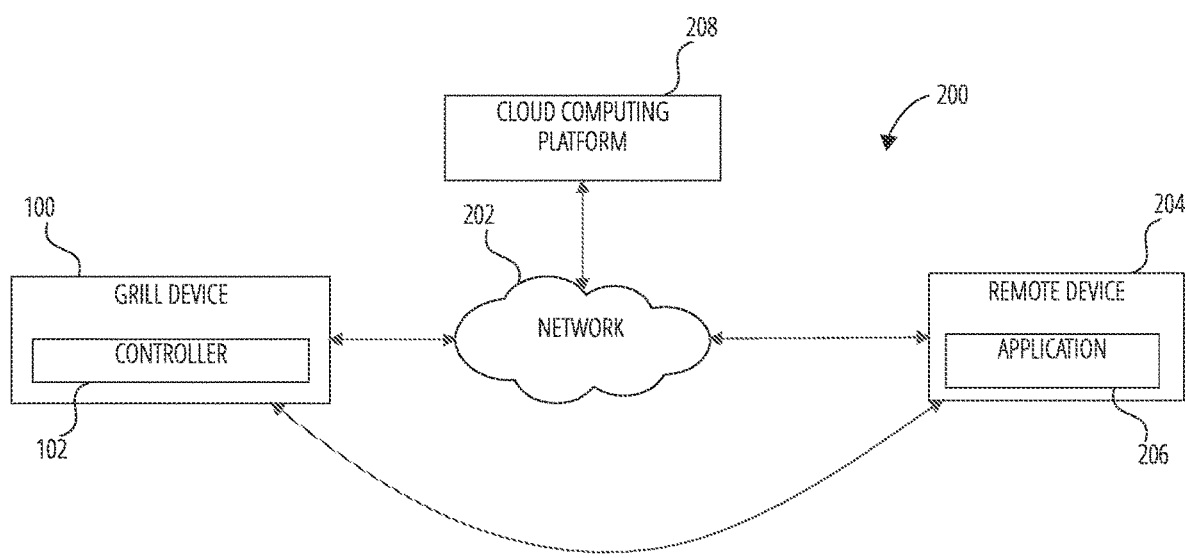
FIG. 2 illustrates a schematic diagram of an environment in which a grill device of the present disclosure may operate in accordance with one or more embodiments of the present disclosure.

FIG. 2 shows a schematic diagram of an environment 200 in which the grill device 100 may operate according to one or more embodiments of the present disclosure. As illustrated, the environment 200 may include the grill device 100, a remote device 204, a network 202, and a cloud computing platform 208. The grill device 100, the remote device 204, and the cloud computing platform 208 may communicate via the network 202. The network 202 may include one or more networks, such as the Internet, and can use one or more communications platforms or technologies suitable for transmitting data and/or communication signals. Although FIG. 2 illustrates a particular arrangement of the grill device 100, the remote device 204, the cloud computing platform 208, and the network 202, various additional arrangements are possible. For example, the grill device 100 can directly communicate with the remote device 204, bypassing the network 202, such as through a hardwired connection or a radio connection (e.g., BLUETOOTH®).

In one or more embodiments, the grill device 100 may include a controller 102 for controlling operations of the grill device 100 at the grill device 100. In some embodiments, the remote device 204 may include an application 206 installed thereon. In one or more embodiments, the application 206 can be associated with the grill device 100. For example, the application 206 may enable the remote device 204 to directly interface with the grill device 100 or indirectly interface with the grill device 100 via the cloud computing platform 208. For example, the grill device 100 and the remote device 204 may communicate via any of the manners described in U.S. Pat. No. 10,158,720, to Colston, issued Dec. 18, 2018, U.S. Pat. No. 10,218,833, to Colston, issued Feb. 26, 2019, and U.S. application Ser. No. 15/114,744, to Colston, filed Jul. 27, 2016, the disclosures of which are incorporated in their entireties by reference herein. Furthermore, the remote device 204 and the cloud computing platform 208 may control the grill device 100 via any of the manners described in the aforementioned patents and patent application. Moreover, the application 206, cloud computing platform 208, and grill device 100 may include any of the capabilities of applications, cloud computing platforms, and grill devices described in the aforementioned patents and patent application.

Both the remote device 204 and the controller 102 can represent various types of computing devices with which users can interact. For example, the remote device 204 can be a mobile device (e.g., a cell phone, a smartphone, a PDA, a tablet, a laptop, a smartwatch, a wearable device, a smart speaker, etc.). In some embodiments, however, the remote device 204 can be a non-mobile device (e.g., a desktop or server).

Figure 3:
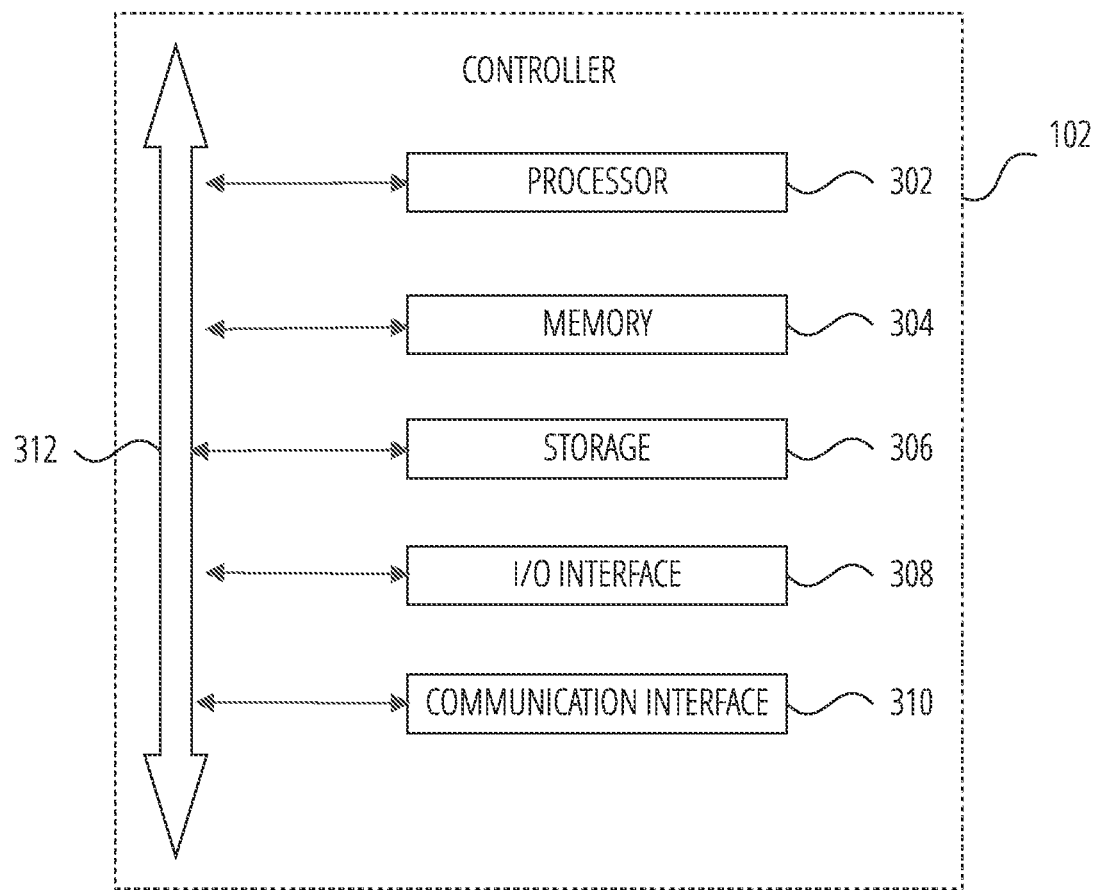
FIG. 3 illustrates a block diagram of an example controller of a grill device in accordance with one or more embodiments of the present disclosure.

FIG. 3 illustrates a block diagram of an example controller 102 that may be configured to perform one or more of the processes described above. One will appreciate that one or more computing devices may form the controller 102 of the grill device 100. As shown by FIG. 3, the controller 102 can comprise a processor 302, a memory 304, storage device 306, an I/O interface 308, and a communication interface 310, which may be communicatively coupled by way of a communication infrastructure. While an example controller 102 is shown in FIG. 3, the components illustrated in FIG. 3 are not intended to be limiting. Additional or alternative components may be used in other embodiments. Furthermore, in certain embodiments, the controller 102 may include fewer components than those shown in FIG. 3.

In one or more embodiments, the processor 302 may include hardware for executing instructions, such as those making up a computer program. As an example, and not by way of limitation, to execute instructions, the processor 302 may retrieve (or fetch) the instructions from an internal register, an internal cache, the memory 304, or the storage device 306 and decode and execute them. In one or more embodiments, the processor 302 may include one or more internal caches for data, instructions, or addresses. As an example, and not by way of limitation, the processor 302 may include one or more instruction caches, one or more data caches, and one or more translation look aside buffers (TLB s). Instructions in the instruction caches may be copies of instructions in the memory 304 or the storage device 306.

The controller 102 may include memory 304, which is coupled to the processor 302. The memory 304 may be used for storing data, metadata, and programs for execution by the processor 302. The memory 304 may include one or more of volatile and non-volatile memories, such as Random-Access Memory ("RAM"), Read-Only Memory ("ROM"), a solid state disk ("SSD"), Flash, Phase Change Memory ("PCM"), or other types of data storage. The memory 304 may be internal or distributed memory.

The controller 102 may include a storage device 306 that includes storage for storing data or instructions. As an example, and not by way of limitation, the storage device 306 may comprise a non-transitory storage medium described above. The storage device 306 may include a hard disk drive (HDD), a floppy disk drive, Flash memory, an optical disc, a magneto-optical disc, magnetic tape, or a Universal Serial Bus (USB) drive or a combination of two or more of these. The storage device 306 may include removable or non-removable (or fixed) media, where appropriate. The storage device 306 may be internal or external to the controller 102. In one or more embodiments, the storage device 306 may be non-volatile, solid-state memory. In other embodiments, the storage device 306 may include read-only memory (ROM). Where appropriate, this ROM may be mask programmed ROM, programmable ROM (PROM), erasable PROM (EPROM), electrically erasable PROM (EEPROM), electrically alterable ROM (EAROM), or Flash memory or a combination of two or more of these.

The controller 102 may also include one or more input or output ("I/O") devices/interfaces 308 (e.g., a touch display), which may be provided to allow a user to provide input to, receive output from, and otherwise transfer data to and receive data from controller 102. The I/O devices/interfaces 308 may include a mouse, a keypad or a keyboard, a touch screen, a camera, an optical scanner, network interface, modem, other known I/O devices or a combination of such I/O device/interfaces. The touch screen may be activated with a stylus or a finger.

The I/O devices/interfaces 308 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 308 may be configured to provide graphical data to a display for presentation to a user. The graphical data may be representative of one or more graphical user interfaces and/or any other graphical content as may serve a particular implementation.

The controller 102 can further include a communication interface 310. The communication interface 310 may include hardware, software, or both. The communication interface 310 may provide one or more interfaces for communication (such as, for example, packet-based communication) between the controller 102 and one or more other computing devices or networks. As an example, and not by way of limitation, the communication interface 310 may include a network interface controller (NIC) or network adapter for communicating with an Ethernet or other wire-based network or a wireless NIC (WNIC) or wireless adapter for communicating with a wireless network, such as a WI-FI and/or BLUETOOTH®. The controller 102 may further include a bus 312. The bus 312 may comprise hardware, software, or both that couples components of controller 102 to each other.

Figure 4:
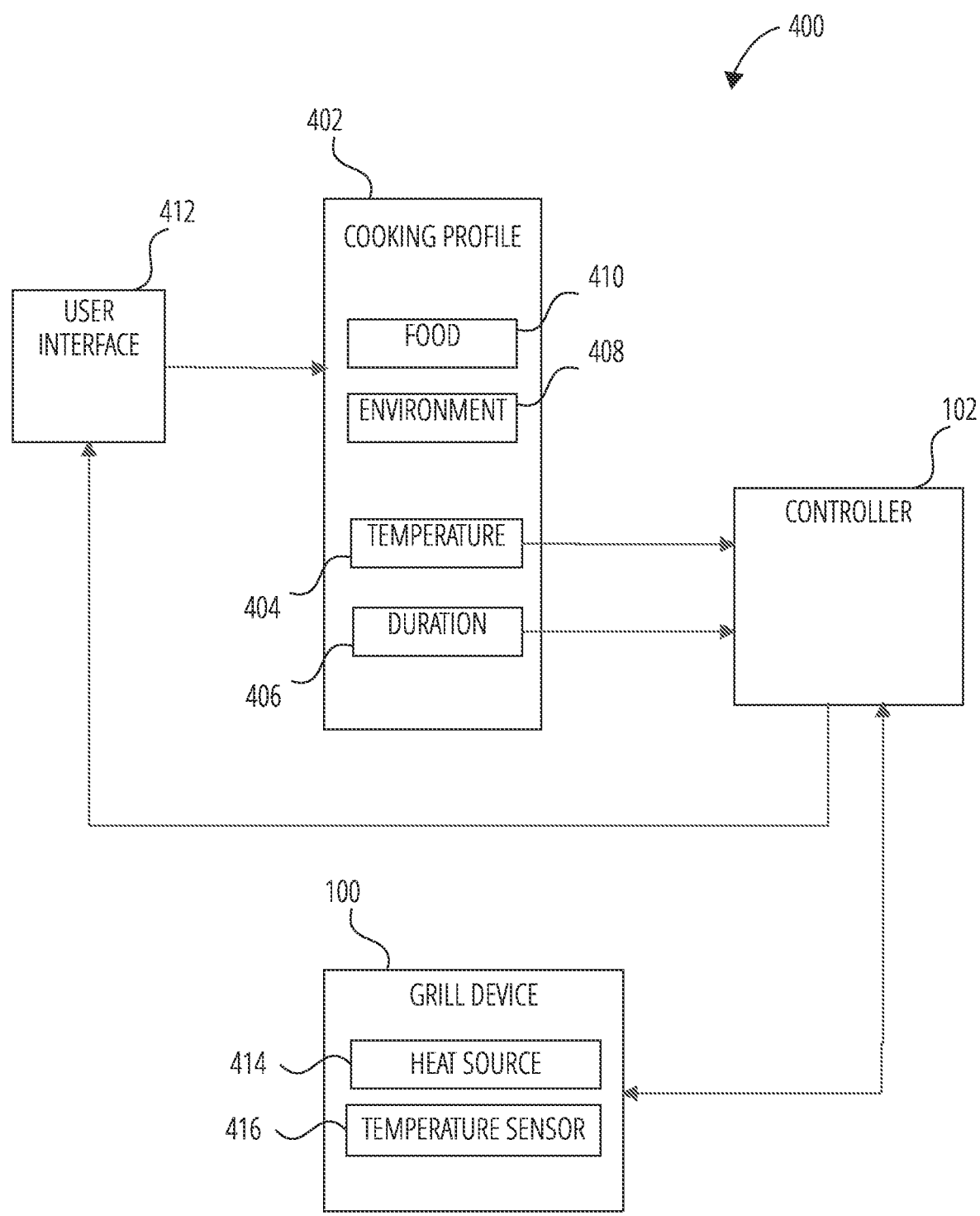
FIG. 4 illustrates a schematic diagram of a cooking session in accordance with one or more embodiments of the present disclosure.

FIG. 4 illustrates a schematic of a cooking session 400 using a grill device 100 having a controller 102. As discussed above, a user may interact with the controller 102 and/or the grill device 100 through a user interface 412. In some embodiments, the user interface 412 may be located on the grill device 100, such as a display panel, touch screen display, key pad, etc. In some embodiments, the user interface 412 may be a remote device communicating with the controller 102 and the grill device 100 through a network connection. For example, the user interface 412 may be a cell phone, a tablet, a computer, a remote controller, etc. The user may input a cooking profile 402 through the user interface 412. The cooking profile 402 may provide the controller 102 with instructions for operating the grill device 100. For example, the cooking profile 402 may provide the controller with a temperature set point 404 of the grill device 100 and a duration 406 defining the amount of time that the grill device 100 should be maintained at the temperature set point 404.

In some embodiments, the temperature set point 404 and the duration 406 may be determined from the type of food 410 being cooked and other environmental data 408. For example, the user may input a type of food 410 being cooked through the user interface 412. The cooking profile 402 may determine a proper temperature set point 404 and duration 406 required to completely cook the food 410. In some embodiments, the user may further input a desired wellness (e.g., rare, medium rare, medium well, well done, etc.) for the selected food 410.

In some embodiments, environmental data 408, such as ambient temperature, moisture, precipitation, wind, etc., may be received and considered in the cooking profile 402. For example, a cold ambient temperature may require that the temperature set point 404 and/or the duration 406 sent to the controller 102 be increased to completely cook the selected food 410 to the desired wellness. In some embodiments, the user interface 412, the controller 102, or the grill device 100 may include environmental sensors configured to provide the environmental data 408 to the cooking profile 402. In some embodiments, the environmental data 408 may be obtained through the network 202, such as from an internet weather service, remote sensors, etc.

In some embodiments, the user may input a recipe into the user interface 412 or select an existing recipe through the user interface 412. In some embodiments, the recipe may include cooking cycles (e.g., pre-programmed cooking routines that control temperature for a specified amount of time to cook or smoke the food item in a certain manner). The cooking cycles may vary a temperature over time with a temperature profile. For example, a cooking cycle may include a temperature profile that starts at a high temperature to provide a sear to the selected food, then the temperature profile may lower the temperature to a low temperature for a long period of time to finish cooking the internal portions of the food without burning the exterior of the food. In some embodiments, the temperature profile may gradually raise the temperature over a period of time providing a final high temperature to finish the food. Examples, of the use and adjustment of recipes and cooking cycles are further described in U.S. Pat. No. 10,158,720, to Colston, issued Dec. 18, 2018, U.S. Pat. No. 10,218,833, to Colston, issued Feb. 26, 2019, and U.S. application Ser. No. 15/114,744, to Colston, filed Jul. 27, 2016, the disclosures of each of which have been incorporated by reference herein.

The cooking profile 402 may be provided to the controller 102, such that the controller 102 may have instructions for the temperature set point 404 and duration 406 including any cooking cycles for the selected food 410. The controller 102 may then control a heat source 414 in the grill device 100 to maintain a temperature of a cooking chamber 112 of the grill to the temperature set point 404 defined by the cooking profile 402. For example, the controller 102 may control a supply of fuel to the heat source 414, such as gas (e.g., natural gas, propane, etc.), solid fuel (e.g., wood pellets, etc.), electricity, etc. In some embodiments, the controller 102 may control the heat source 414 through the supply of other necessities for combustion, such as air. For example, the controller 102 may control an air supply damper or an air moving device, such as a fan. In some embodiments, the grill device 100 may include multiple heat sources 414. The controller 102 may control the temperature by staging the multiple heat sources 414 on and off as necessary. The temperature of the cooking chamber 112 may be verified through a temperature sensor 416 configured to provide the controller 102 with temperature readings from the cooking chamber 112 of the grill device 100.

In some embodiments, the cooking profile 402 may include further instructions for cooking the selected food 410, such as basting times, times to add ingredients (e.g., seasoning, toppings, etc.), times to flip the food item, times to rotate the food item, etc. The controller 102 may receive these additional instructions from the cooking profile 402. The controller 102 may provide alerts to the user through the user interface 412 when the times are reached where the different instructions should be completed. In some embodiments, the controller 102 may sound an audible alarm at the grill device 100 and/or the remote device alerting the user that an action should be taken.

Figure 5:
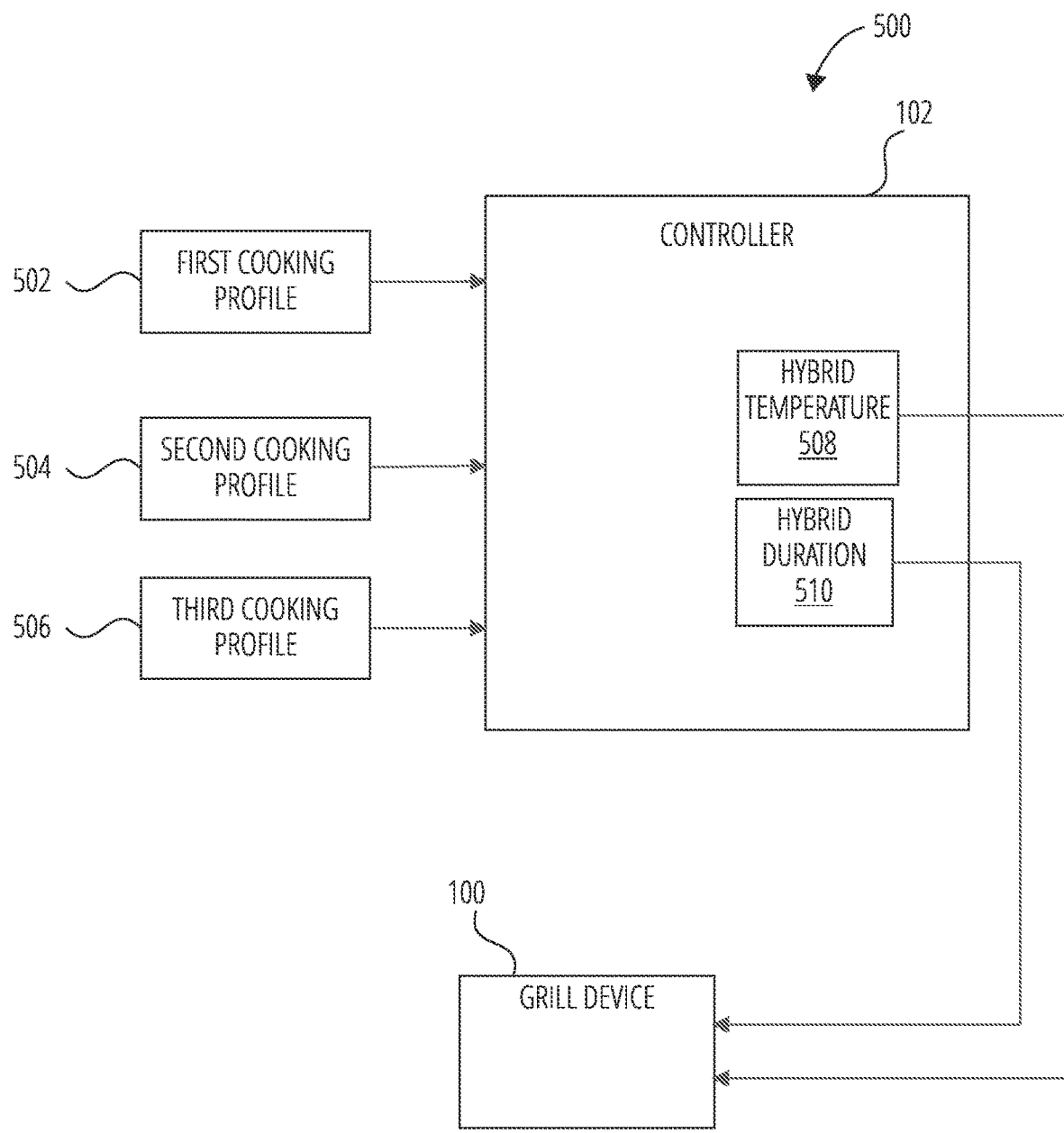
FIG. 5 illustrates a schematic diagram of a meal control sequence in accordance with one or more embodiments of the present disclosure.

In some embodiments, more than one food item may need to be cooked on the same grill device 100. For example, when preparing a meal, the meal may include a meat, such as steak, chicken, turkey, fish, etc., along with vegetables, potatoes, breads, etc. The different food items may require different temperatures and durations for complete preparation. If the food items are prepared individually multiple grill devices may be required or some food items may cool before subsequent food items are completely prepared. Automatically adjusting one or more of a temperature and/or duration of the cooking profiles 402 of the individual food items may enable a user to cook multiple different food items simultaneously on the same grill device. FIG. 5 illustrates a meal control schematic 500 for controlling the grill device 100 when cooking more than one type of food.

The controller 102 may receive a first cooking profile 502 associated with a first type of food, such as a meat. The controller 102 may also receive a second cooking profile 504 associated with another type of food, such as a vegetable, squash, etc. The controller 102 may receive a temperature set point and a duration, and/or a cooking cycle with a temperature profile from the first cooking profile 502 and a second set of temperature set point, duration, and/or cooking cycle from the second cooking profile 504. The controller 102 may combine the temperatures, durations, and/or cooking cycles from the first cooking profile 502 and the second cooking profile 504 into hybrid instructions for the grill device 100. For example, if the temperature of the first cooking profile 502 is lower than the temperature of the second cooking profile 504, the controller 102 may determine that the food item associated with the second cooking profile 504 may be cooked to substantially the same wellness if cooked at the lower temperature of the first cooking profile 502 for a longer duration of time. In some embodiments, the controller 102 may control the grill device 100 to a temperature between the temperature of the first cooking profile 502 and the temperature of the second cooking profile 504 and adjust the durations of each accordingly.

The controller 102 may provide instructions to the user through the user interface 412 (FIG. 4). For example, the controller 102 may instruct the user which food item should be placed in the cooking chamber 112 of the grill device 100 first. For the purposes of the description it will be assumed that the first food item associated with the first cooking profile 502 is the food item that is placed in the cooking chamber 112 first. The controller 102 may then control the grill device 100 to the temperature defined by the first cooking profile 502 until the time is reached where the second food item should be placed in the cooking chamber 112. The controller 102 may then alert the user and/or instruct the user to place the second food item in the cooking chamber 112. Once the second food item is placed in the cooking chamber 112, the controller 102 may control the grill device 100 to the hybrid temperature 508, until the final duration time is reached.

In some embodiments, the time to insert the second food item may be determined such that the two food items will finish at substantially the same time. For example, the large amount of meat, such as a brisket, a turkey, etc., may take a large amount of time to cook, whereas a vegetable side may cook in a relatively short amount of time. The controller 102 may instruct the user to place the vegetable side in the cooking chamber 112 when the controller 102 calculates that the vegetable will finish cooking at substantially the same time as the meat that has been in the cooking chamber 112 for a substantially greater amount of time. In some embodiments, the controller 102 may raise or lower the temperature in the cooking chamber 112 based on the needs of the vegetable such that the vegetable and/or the meat will cook at a different rate to finish at substantially the same time.

In some embodiments, a third food associated with a third cooking profile 506 may also be involved in the meal preparation. The controller 102 may treat the third cooking profile 506 in a similar manner predicting an appropriate hybrid temperature 508 and hybrid duration 510 for cooking all three food items on the same grill device 100. In some embodiments, the controller 102 may be configured to receive several different cooking profiles 502, 504, and 506. Such as four cooking profiles, ten cooking profiles, etc.

In some embodiments, the controller 102 may instruct the user to cook some of the associated food items separately. For example, some of the food items may require temperatures that are substantially different such that cooking the two different food items at the same time would be impractical. In such cases, the controller 102 may group the food items into compatible groups, such that foods requiring a temperature substantially higher than other foods may be grouped together. In some embodiments, the controller 102 may recognize cooling or resting times of some of the food items and account for the cooling or resting times when determining when to cook each of the groups. For example, one group of foods may cook at a substantially higher temperature for a relatively short period of time and another group of foods may require a relatively large period of time to cook at a substantially lower temperature. The controller 102 may account for a cooling or resting time period for the group of foods cooking for a relatively large amount of time at a low temperature and instruct the user to cook foods requiring the high temperature and short period of time while the food requiring the low temperature and large period of time is cooling or resting. In some embodiments, the controller 102 may determine if portions of a cooking cycle may be adjusted such that some foods that may otherwise not be cooked together may be cooked together. For example, a searing cycle may be moved such that a food item requiring a high temperature for a short period of time may be cooked during the sear cycle where the temperature is substantially higher in the cooking chamber 112.

In some embodiments, the controller 102 may have access to hybrid cooking profiles for common combinations or pairings of foods. For example, hybrid cooking profiles for foods that may be commonly cooked together may be available for a user to select when a common combination of foods is being cooked. In cases where the combination is not an available hybrid cooking profile, the controller 102 may generate the hybrid profile(s) as described above.

Figure 6:
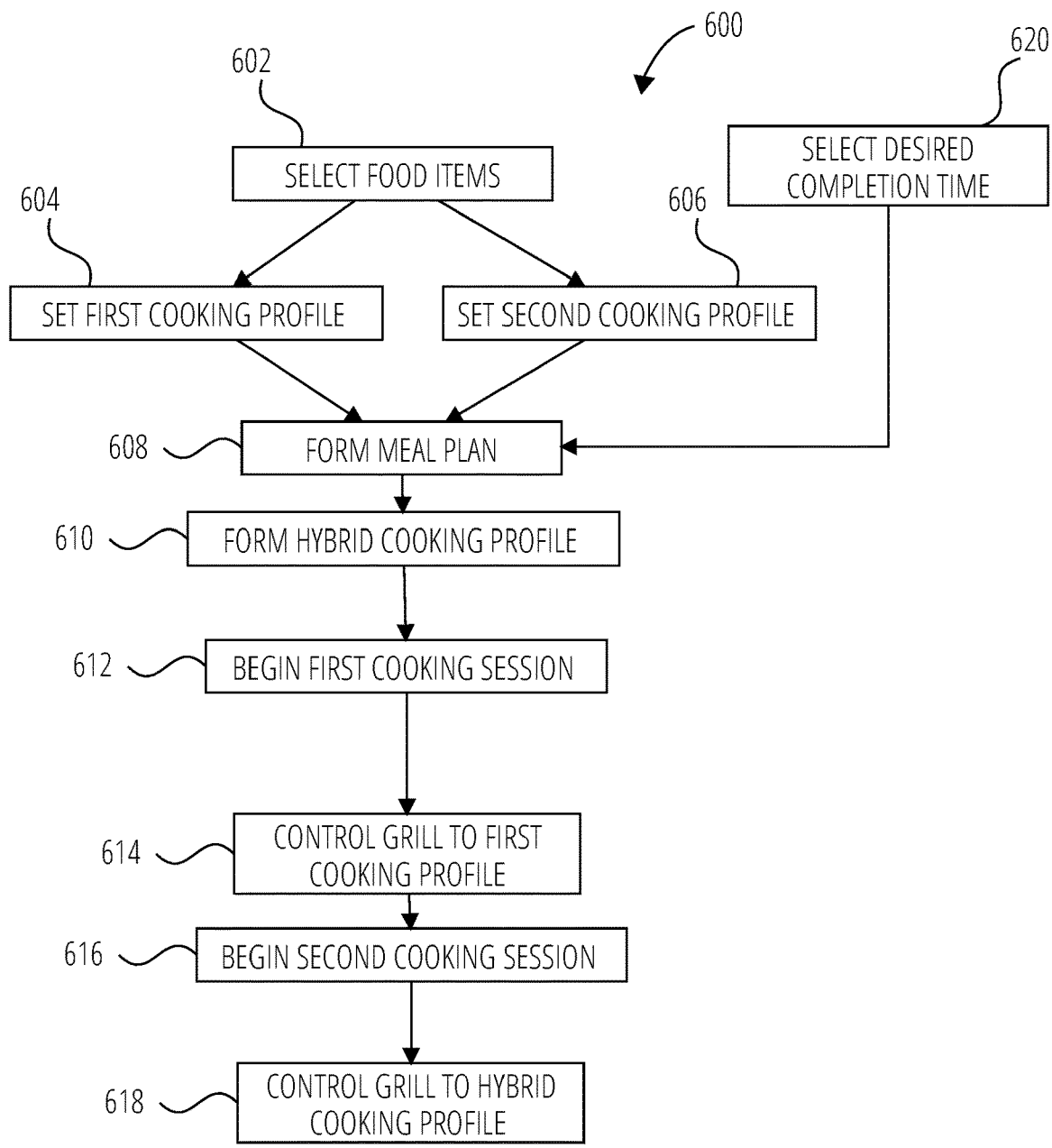
FIG. 6 illustrates a flow chart representative of a method of controlling a grill device in accordance with one or more embodiments of the present disclosure.

FIG. 6 illustrates a flow chart representative of a method 600 of controlling a grill. The user may first select a number of food items in act 602. For example, the user may select a type of meat to cook, such as steak, hamburger, chicken, turkey, fish, etc. The user may also select a vegetable and/or fruit to cook, such as cabbage, carrots, squash, tomatoes, broccoli, etc. In some embodiments, the user may select another type of food, such as potatoes, bread, etc.

Once the user has selected the food items in act 602, the user may set a cooking profile associated with each food in act 604 and act 606. The cooking profiles may be selected based on the type of food selected by the user. In some embodiments, the cooking profiles may be associated with a recipe selected by the user. For example, the user may download a cooking profile associated with a recipe or enter a cooking profiled based on a recipe. In some embodiments, the controller 102 may include recipes or cooking profiles in a storage device 306 in the controller 102 that the user may select. In some embodiments, the cooking profiles may be selected based on a desired wellness of the food. In some embodiments, the user may customize the cooking profiles, such as adjusting the temperature profile, adjusting the duration, etc. In some embodiments, the controller 102 may automatically adjust the cooking profile based on ambient conditions in the area around the grill device 100.

Once the cooking profiles have been set a meal plan may be formed in act 608. The meal plan may be formed to complete cooking the food items selected in act 602 according to the cooking profiles set in act 604 and act 606 at substantially the same time, such that the cooked food items may be served at substantially the same time. For example, forming the meal plan may include determining what time the food items should be placed in the cooking chamber 112 of the grill device 100 with respect to the other food items. In some embodiments, one or more of the cooking profiles may include portions of time where it would be impractical to cook another food item during the same portion of time. For example, some cooking profiles may include a searing time period where the cooking profile requires a high temperature for a short period of time to sear or char an outside surface of the food item. The high temperature may cause some food items to burn even over the short time period. Therefore, the meal plan may account for such periods of time when determining when to place other food items in the cooking chamber 112. In some embodiments, the portion of the cycle that may be incompatible with another cooking profile may be moved to another portion of the cycle. For example, a searing cycle may be moved from the end of a cooking cycle to the beginning of the cooking cycle. In some embodiments, if the cooking profile includes a searing cycle at the end of the cooking cycle, the meal plan may include instructions to the user to remove the other food item(s) before commencing the searing cycle.

Forming the meal plan may also include adjusting temperatures and/or durations of the individual cooking profiles and forming a hybrid cooking profile, as shown in act 610, such that the individual food items may be cooked at the same time at substantially the same temperature. For example, if a first cooking profile has a higher temperature than a second cooking profile, the temperatures of the two cooking profiles may be adjusted to a temperature between the two temperatures. The duration of each of the cooking profiles may also be adjusted. For example, the first cooking profile may have the temperature of the cooking profile lowered and the duration extended such that the food item associated with the first cooking profile may cook to substantially the same degree of wellness at the lower temperature. Similarly, the second cooking profile may have the temperature increased and the duration may decrease such that the food item associated with the second cooking profile may cook to the same degree of wellness at the higher temperature without overcooking (e.g., burning, drying out, etc.).

In some embodiments, more than two food items may be selected in act 602. The meal plan formed in act 608 may identify multiple different starting times for the different food items. Thus, multiple different hybrid cooking profiles may be formed addressing each of the different food items that may be in the cooking chamber 112 at any given time. For example, one hybrid cooking profile may be configured to address a first food item and a second food item being in the cooking chamber 112 at the same time. A second hybrid cooking profile may be configured to address the first food item, the second food item, and a third food item being in the cooking chamber 112 at the same time. A third hybrid cooking profile may be configured to address the first food item and the third food item being in the cooking chamber 112 at the same time. A fourth hybrid cooking profile may be configured to address the second food item and the third food item being in the cooking chamber 112 at the same time. The times when each different food item will be in the cooking chamber 112 may be defined by the meal plan and the appropriate hybrid cooking profile may be associated with the meal plan at each time period.

Once the meal plan is formed in 608 and the hybrid cooking profile is formed in act 610, a first cooking session may begin in act 612. In some embodiments, the first cooking session may include only one food item. For example, one food item may require a longer period of time to cook than the other food items. The food item requiring the longest period of time to cook may be placed in the cooking chamber 112 and the grill device 100 may be controlled to the cooking profile associated with the food item in act 614. If a portion of the cooking profile was adjusted when the hybrid cooking profile was formed, the adjusted cooking profile may be used. For example, if a searing cycle is moved to the beginning of the cooking profile, the grill device 100 may be controlled to the searing cycle at the beginning of the first cooking session even if the original cooking profile had the searing cycle at the end of the cooking profile.

In some embodiments, the first cooking session may include more than one food item. For example, the meal plan may instruct that two different food items should be started at substantially the same time. Thus the grill device 100 may be controlled to the hybrid cooking profile in the first session to accommodate the different food items being cooked.

Once the time is reached in the meal plan for another food item to be placed in the cooking chamber 112, a second cooking session may commence in act 616. In some embodiments, the grill device 100 may alert the user that it is time to commence the second cooking session. The user may then place the second food item into the cooking chamber 112. In some embodiments, the grill device 100 may alert the user before the second cooking session is scheduled to begin. For example, the grill device 100 may provide an alert five minutes before the second cooking session is scheduled to begin, such that the user has enough time to retrieve the second food item and place the second food item in the cooking chamber 112. In some embodiments, the grill device 100 may automatically start the second cooking session after alerting the user. In some embodiments, the grill device 100 may require input from the user before starting the second cooking session. For example, the user may acknowledge the alert thereby alerting the grill device 100 that the second food item has been placed in the cooking chamber 112. In some embodiments, if the user does not input the second food item the grill device 100 may continue to follow the cooking profile associated with the food item(s) in the first cooking session.

When the second cooking session begins in act 616 the grill device 100 may be controlled to the hybrid cooking profile formed in act 610 as illustrated in act 618. As described above, in some embodiments, multiple different hybrid cooking profiles may be formed and associated with different combinations of food items in the cooking chamber 112. Similarly, multiple cooking sessions may be identified in the meal plan associated with the different combinations of food items. The different hybrid cooking profiles may be associated with the corresponding cooking sessions. The grill device 100 may alert the user upon each change of cooking session, such that the user may make the appropriate adjustments to the food in the cooking chamber 112, before the temperature of the grill is adjusted to the temperature defined by the appropriate hybrid cooking profile. For example, a first cooking session may include a first food item in the cooking chamber 112. The second cooking session may add a second food item to the cooking chamber 112 along with the first food item. A third cooking session may add a third food item to the cooking chamber 112 along with the first and second food items. A fourth cooking session may remove the second food item from the cooking chamber 112. For example, the cooking profiles associated with the first food item and the third food item may include a searing cycle and the searing cycle may have the potential to burn or overcook the second food item. Thus, when the meal plan is formed in act 608, the meal plan may identify the need to remove the second food item from the cooking chamber 112 before beginning the searing cycle for the other food items.

In some embodiments, the user may select a desired completion time in act 620 when the user desires the food being cooked to be complete and ready to eat. Once the meal plan is formed in 608 and the hybrid cooking profile is formed in act 610, the meal plan may then provide the user with a starting time. For example, once the meal plan is formed in 608 and the hybrid cooking profile is formed in act 610, the grill device 100 and the associated controller 102 may calculate the duration of the meal plan and hybrid cooking profile. The grill device 100 and associated controller 102 may then determine a start time for the meal plan and hybrid cooking profile, such that the associated food items will be cooked and ready to serve at the desired completion time.

In some embodiments, the meal plan and hybrid cooking profiles may also account for additional non-cooking times, such as marinating times, resting times, and other associated preparation times. When the user selects a desired completion time, the grill device 100 and or controller 102 may provide the user with a start time including when the associated preparation processes, such as marinating, should be started, such that the food items associated with the meal plan and hybrid cooking profiles are cooked and ready to serve at the desired completion time.

Cooking a meal with a single grill device, may be difficult because different food items involved in the meal may require different temperatures and cooking times to prepare. Cooking the different food items at different times may result in some of the food items being cold when the meal is served. Embodiments of the present disclosure may enable a user to cook multiple food items on a single grill device at substantially the same time. The efforts of the user to determine necessary temperatures and cooking times may be reduced by enabling the user to input known temperatures and cooking times for each individual food item. Further, the embodiments of the present disclosure may enable a user to place the different food items in the cooking chamber at the appropriate times such that each of the food items in the meal may finish cooking at substantially the same time. Thus, the embodiments of the present disclosure may enable a user to easily prepare multiple different food items on the same grill device at substantially the same time to be served at substantially the same time.

The embodiments of the disclosure described above and illustrated in the accompanying drawings do not limit the scope of the disclosure, which is encompassed by the scope of the appended claims and their legal equivalents. Any equivalent embodiments are within the scope of this disclosure. Indeed, various modifications of the disclosure, in addition to those shown and described herein, such as alternate useful combinations of the elements described, will become apparent to those skilled in the art from the description. Such modifications and embodiments also fall within the scope of the appended claims and equivalents.

What is claimed is:

1. A method of cooking a meal, the method comprising:
   beginning a first cooking session for a first food item;
   receiving a first cooking profile associated with the first food item, wherein the first cooking profile comprises at least one first temperature set point and at least one first time period;
   controlling a temperature of a grill to the first cooking profile;
   beginning a second cooking session for a second food item before the first cooking session is completed;
   receiving a second cooking profile associated with the second food item, wherein the second cooking profile comprises at least one second temperature set point and at least one second time period;
   combining the first cooking profile and the second cooking profile to form a hybrid cooking profile comprising at least one third temperature set point and at least one third time period; and
   controlling the grill to the hybrid cooking profile after beginning the second cooking session.

2. The method of claim 1, wherein at least one of the first cooking profile and the second cooking profile comprise a temperature profile over time.

3. The method of claim 2, wherein the temperature profile comprises at least two different temperature set points and at least two time periods associated with the at least two different temperature set points.

4. The method of claim 1, further comprising identifying a start time for the second cooking session.

5. The method of claim 4, wherein identifying the start time for the second cooking session comprises identifying the start time for the second cooking session that causes each of the at least one first time period, the at least one second time period, and the at least one third time period to finish at substantially a same time.

6. The method of claim 1, further comprising
   beginning a third cooking session for a third food item after beginning the second cooking session and before at least one of the first cooking session and the second cooking session is completed;
   receiving a third cooking profile associated with the third food item, wherein the third cooking profile comprises at least one fourth temperature set point and at least one fourth time period;
   combining the first cooking profile, the second cooking profile, and the third cooking profile to form a second hybrid cooking profile comprising at least one fifth temperature set point and at least one fifth time period; and
   controlling the grill to the second hybrid cooking profile after beginning the third cooking session.

7. The method of claim 6, wherein combining the first cooking profile, the second cooking profile, and the third cooking profile further comprises combining the first cooking profile and the third cooking profile to form a third hybrid cooking profile.

8. The method of claim 7, further comprising:
   identifying a time when the second food item should be removed; and
   controlling the grill to the third hybrid cooking profile after the time when the second food item should be removed.

9. The method of claim 6, wherein combining the first cooking profile, the second cooking profile, and the third cooking profile further comprises combining the second cooking profile and the third cooking profile to form a third hybrid cooking profile.

10. The method of claim 9, further comprising:
    identifying a time when the first food item should be removed; and
    controlling the grill to the third hybrid cooking profile after the time when the first food item should be removed.

11. A non-transitory computer readable medium storing instructions thereon that, when executed by at least one processor, cause the at least one processor to perform steps comprising:
    begin a first cooking session for a first food item, wherein the first cooking session comprises a first cooking profile associated with the first food item, wherein the first cooking profile comprises at least one first temperature set point and at least one first time period;
    control a grill to the first cooking profile;
    begin a second cooking session for a second food item before the first cooking session is completed, wherein the second cooking session comprises a second cooking profile associated with the second food item, wherein the second cooking profile comprises at least one second temperature set point and at least one second time period;
    combine the first cooking profile and the second cooking profile to form a hybrid cooking profile comprising at least one third temperature set point and at least one third time period; and
    control the grill to the hybrid cooking profile after beginning the second cooking session.

12. The non-transitory computer readable medium of claim 11, wherein at least one of the first cooking profile and the second cooking profile comprise a temperature profile over time.

13. The non-transitory computer readable medium of claim 11, wherein the instructions cause the at least one processor to:
control a heat source of the grill to match the at least one first temperature set point of the first cooking profile after the first cooking session begins and before the second cooking session begins; and
control the heat source of the gill to meet the at least one third temperature set point after the second cooking session begins.

14. The non-transitory computer readable medium of claim 11, wherein the instructions cause the at least one processor to calculate a start time to begin the first cooking session configured to complete the first cooking session and the second cooking session at a specified finish time.

15. The non-transitory computer readable medium of claim 11, wherein the instructions cause the at least one processor to calculate a start time for the second session.

16. The non-transitory computer readable medium of claim 15, wherein the start time for the second session is calculated to enable the first food item and the second food item to finish cooking at substantially a same time.

17. The non-transitory computer readable medium of claim 11, wherein the instructions cause the at least one processor to provide an alert when the second cooking session begins.

18. The non-transitory computer readable medium of claim 11, wherein the at least one third temperature set point is different from both the at least one first temperature set point and the at least one second temperature set point.

19. A grill device comprising:
a cooking chamber operatively coupled to a heat source, wherein the cooking chamber is configured to receive a first food item and a second food item; and
a controller comprising:
at least one processor configured to control the heat source; and
a memory device configured to receive a first cooking profile for the first food item and a second cooking profile for the second food item;
at least one non-transitory computer-readable storage medium storing instructions thereon that, when executed by the at least one processor, cause the controller to:
control the heat source to a first cooking chamber temperature defined by the first cooking profile when the first food item is in the cooking chamber;
control the heat source to a second cooking chamber temperature defined by the second cooking profile when the second food item is in the cooking chamber;
combine the first cooking profile and the second cooking profile into a hybrid cooking profile when both the first food item and the second food item are in the cooking chamber; and
control the heat source to a third cooking chamber temperature defined by the hybrid cooking profile.

20. The grill device of claim 19, further comprising a display device operatively coupled to the controller, wherein the instructions cause the controller to provide one or more alerts to the display device.

* * * * *

UNITED STATES PATENT AND TRADEMARK OFFICE
CERTIFICATE OF CORRECTION

PATENT NO. : 12,004,546 B2
APPLICATION NO. : 17/249844
DATED : June 11, 2024
INVENTOR(S) : Michael B. Strong, Chad Sollis and Ryan Tarver It is certified that error appears in the above-identified patent and that said Letters Patent is hereby corrected as shown below:

In the Specification
Column 5, Lines 65-66, change "buffers (TLB s). Instructions" to --buffers (TLBs). Instructions--

In the Claims
Claim 6, Column 14, Line 4, change "further comprising" to --further comprising:--
Claim 13, Column 15, Line 13, change "of the gill to meet" to --of the grill to meet--

Signed and Sealed this
Sixth Day of August, 2024

Katherine Kelly Vidal
*Director of the United States Patent and Trademark Office*